Jan. 2, 1940.　　　　　J. SOLLIE　　　　　2,185,651
MILK SAMPLER
Filed Aug. 6, 1938
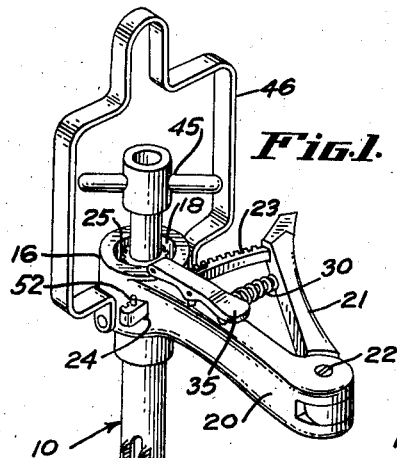
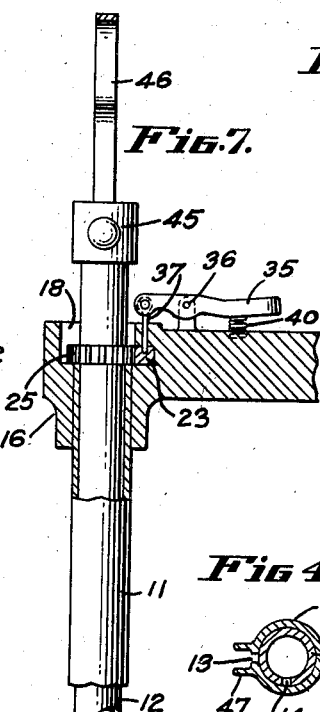
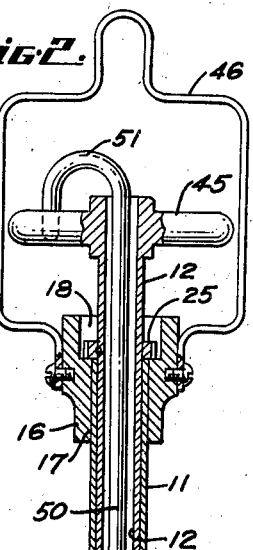
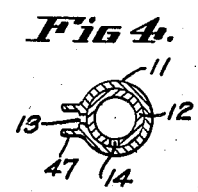
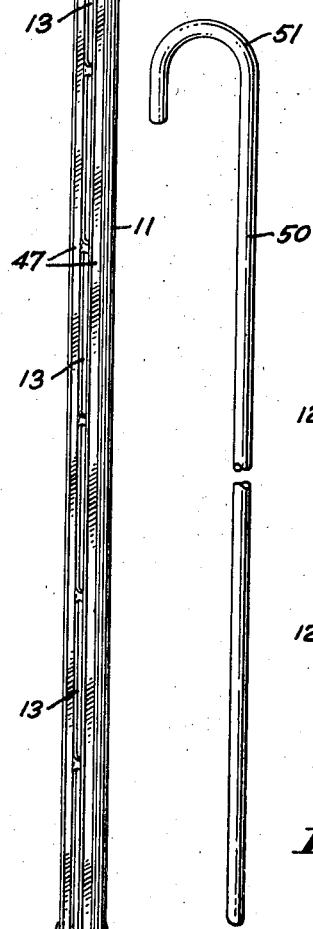
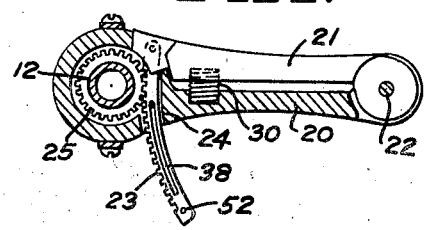
INVENTOR.
JOHN SOLLIE
BY Jas. M. Naylor
ATTORNEY Patented Jan. 2, 1940

2,185,651

UNITED STATES PATENT OFFICE 2,185,651

MILK SAMPLER

John Sollie, Oakland, Calif.

Application August 6, 1938, Serial No. 223,468

7 Claims. (Cl. 137—18)

This invention relates to milk samplers such as are used in the taking of a small sample of milk from a large quantity.

Milk sampling devices consisting of a tube within a tube, there being slots or apertures in the two tubes which are adapted to be brought into registry to open and close the device in the taking of a sample, are well known in the art. The present invention consists in improvements in milk sampling devices embodying these basic elements. It is an object of this invention to provide an efficient and simplified means to open and close the sampler. Another object of the invention is to provide a convenient means for varying the quantity of the fluid taken as a sample. Additionally, it is an object of the invention to provide an efficient means for emptying the sampler of its fluid contents.

These and other objects will become more apparent as this specification proceeds and the invention will be particularly pointed out in the appended claims.

In the drawing forming a part hereof,

Figure 1 is a perspective view of a milk sampler constructed according to my invention, Figure 2 is a vertical or longitudinal section of the device of my invention disclosing the means for varying the quantity of the sample, Figure 3 is a top plan view of the mechanism employed to open and close the sampler, Figure 4 is a cross-section of the sampler body to show the relation of the ports therein when the device is closed, Figure 5 is a top plan view, partly in section, of the sampler actuating mechanism of Figure 3 showing the position of the latter when the sampler is open, Figure 6 is a cross-section of the sampler body showing the ports therein in open position or opposite that shown in Figure 4, Figure 7 is a side elevation of the head of the sampler illustrating the control means for the sampler opening and closing mechanism, and Figure 8 is an elevation of a displacement member used to vary the capacity of the sampler.

The sampler of my invention, generally designated by the numeral 10, is based upon the use of an outer tube 11 and an inner tube 12, each having a plurality of longitudinally extending slots 13 and 14, respectively, which in the operation of the device are adapted to be brought in and out of registry to open and close the device. As will be noted from Figure 2 of the drawing, the outer tube 11 is open at its bottom end while inner tube 12 fits snugly therein and has a closed bottom end 15.

A head 16 is provided for the upper end of outer tube 11 and has a bore 17 therethrough to receive the inner tube 12. The upper end of the bore 17 in head 16 is enlarged to form a recess 18, for a purpose which will be hereinafter explained.

An arm 20, formed as an integral part of and projecting at right angles from the head 16 serves as one-half of the grip for the operator. The second half of the grip is provided by an arm 21 pivotally connected to the outer end of arm 20, as at 22. A rack segment 23 attached to the inner end of arm 21 is adapted to be moved through an aperture 24 at the juncture of head 16 and arm 20, being constantly engaged with a pinion gear 25 keyed to inner tube 12 and fitted in the recess 18 in head 16.

The function of the mechanism just described, as is obvious, is to rotate the inner tube 12 with respect to outer tube 11 and open and close the ports 13 and 14. The arms 20 and 21 are normally spread apart by a coil spring 30 disposed therebetween, which is to say that the ports 13 an 14 are in closed position, as indicated in Figure 4. When it is desired that a sample be taken the operator squeezes arm 21 toward the arm 20, overcoming the tension of spring 30 and thus rotates inner tube 12 with respect to outer tube 11 until the ports 13 and 14 are brought into registry or in open position as indicated in Figure 6 of the drawing. Figure 5 illustrates the relative position of the arms 20 and 21 when the ports are in the open position illustrated in Figure 6.

As a means of locking the sampler in positive open position to the end that a true sample may be taken, I provide a trigger 35 pivotally mounted, as at 36, on the top of arm 20 in a position convenient to the thumb of the operator. A pin 37 attached to one end of trigger 35 extends through a portion of the head 16 into the aperture 24, rides in the slot 38 in rack segment 23 when released, and is urged into the hole 39 in rack segment 23 to lock the sampler in its open position (Figures 5 and 6) when spring 40 urges trigger 35 about its pivot 36.

The inner tube 12 is provided with a T-head 45 to serve as a handle for convenient separation and cleaning of the parts of the sampler, there being but a frictional engagement between the inner and outer tubes 11 and 12 respectively. A bail 46, secured to the head 16 permits the suspension of the device, if desired, in the taking of sample or when the same is not in use.

As will be noted from Figures 1, 2, 4 and 5, longitudinally extending fins 47 are disposed on either side of the slots 13. The purpose of the fins is to prevent the fluid being discharged from the sampler flowing around the outer surfaces of the tube 11 and to direct its flow toward the bottom end of the tube 11 and into a sample receptacle.

Inasmuch as the quantity of sample of various fluids, such for example as milk, varies in the different States and jurisdictions, I have provided a convenient and yet efficient means of varying the capacity of my sampler. Figure 8 shows a rod 50, having its upper end bent to provide a handle 51, adapted to be inserted in inner tube 12 with the handle 51 overhanging the T-head 45. In actual practice a plurality of displacement rods 50 would be provided, each being of a different diameter. Therefore, if in taking a sample of milk in the State of California we assume that the law requires a pint sample, i. e., normal capacity of the sampler, and it be assumed that the law of the same State with respect to the sampling of olive oil or any other fluid called for a half pint sample, one would merely have to select from a plurality of rods 50 one designated as being of sufficient diameter to reduce the capacity of inner tube 12 by one-half.

In operation the operator inserts the sampler 10 into a tank or other receptacle of milk or other fluids in the closed position illustrated in Figures 1 and 3 in the drawing. When the sampler 10 has been inserted to the proper depth, the handles 20 and 21 are gripped and the latter is squeezed toward the former against the urge of spring 30. Rack segment 23 is thus caused to move in aperture 24, rotating inner tube 12 by engagement with the pinion gear 25. When the handles 20 and 21 have been moved into the position illustrated in Figure 5 of the drawing, pin 37 drops into the hole 39 in rack segment 23 to lock the sampler in its open position (see Figure 6). The fluid being sampled will enter inner tube 13 through the ports 13 and 14, extending for substantially the entire length of the tubes 11 and 12, and therefore a true sample of the fluid at all levels in the tank will be obtained. When the sampler is filled the operator releases trigger 35 by pressing the same downwardly against the urge of spring 40 to lift pin 37 out of engagement with the rack segment 23, whereupon arm 21 is urged away from arm 20 under the tension of coil spring 30, the rack and pinion turning inner tube 12 to close the ports 13 and 14 (see Figure 4). A pin 52, disposed at the outer end of rack segment 23, acts as a stop against head 16 to check the movement of arm 21 and rack segment 23 under the urge of spring 30.

From the foregoing it is clear that I have devised an inexpensive and yet highly efficient mechanism for the purpose described and while a preferred form of my invention is illustrated in the drawing, the invention may take other forms, for which reason I do not wish to be understood as limiting myself to the single form shown but desire full protection according to the scope of the appended claims.

The invention claimed is:

1. In a sampling device for fluids embodying a pair of telescoped tubes each having a plurality of longitudinally extending slots adapted to be brought into registry to open the device, a head rigidly attached to the outer tube, a handle member integral with said head, a pinion gear on the inner tube, a rack segment engaging said gear, an arm pivotally connected at one end to said handle and at its other end to said rack and movable relative to said handle to rotate the inner tube in opening and closing the device, and yieldable means normally urging apart said arm and said handle.

2. In a sampling device for fluids embodying a pair of telescoped tubes each having a plurality of longitudinally extending slots adapted to be brought into registry to open the device, a head rigidly attached to the outer tube, a handle member integral with said head, a pinion gear on the inner tube, a rack segment engaging said gear, an arm pivotally connected at one end to said handle and at its other end to said rack and movable relative to said handle to rotate the inner tube in opening and closing the device, yieldable means normally urging apart said arm and said handle, and means limiting the spread of said arm and said handle under the urge of said yieldable means to define closed position of said inner tube.

3. In a sampling device for fluids embodying a pair of telescoped tubes each having a plurality of longitudinally extending slots adapted to be brought into registry to open the device, a head rigidly attached to the outer tube, a handle member integral with said head, a pinion gear on the inner tube, a rack segment engaging said gear, an arm pivotally connected at one end to said handle and at its other end to said rack and movable relative to said handle to rotate the inner tube in opening and closing the device, yieldable means normally urging apart said arm and said handle, means limiting the spread of said handle under the urge of said yieldable means to define the closed position of said inner tube, and means for locking said arm and said handle when compressed and against the tension of said yieldable means to maintain the device in its opened condition.

4. In a sampling device for fluids embodying a pair of telescoped tubes each having a plurality of longitudinally extending slots adapted to be brought into registry to open the device, a head rigidly attached to the outer tube, a handle member integral with said head, a pinion gear on the inner tube, a rack segment engaging said gear, an arm pivotally connected at one end to said handle and at its other end to said rack and movable relative to said handle to rotate the inner tube in opening and closing the device, yieldable means normally urging apart said arm and said handle, means limiting the spread of said handle under the urge of said yieldable means to define the closed position of said inner tube, and trigger means engaging said rack segment to lock said arm and handle in compressed position and the device in its opened condition against the tension of said yieldable means.

5. In a sampling device for fluids embodying a pair of telescoped tubes each having a plurality of longitudinally extending slots adapted to be brought into registry to open the device, a head rigidly attached to the outer tube, a recess therein, a handle member integral with said head, a pinion gear on the inner tube seated in the recess in said head, an aperture through said head opening into said recess, a rack segment in said aperture and movable therethrough in engagement with said gear, an arm pivotally connected at one end to said handle and at its other end to said rack and movable relative to said handle to rotate the inner tube in opening and closing the device, and yieldable means normally urging apart said arm and said handle.

6. In a sampling device for fluids embodying a pair of telescoped tubes each having a plurality of longitudinally extending slots adapted to be brought into registry to open the device, a head rigidly attached to the outer tube, a recess therein, a handle member integral with said head, a pinion gear on the inner tube seated in the recess in said head, an aperture through said head opening into said recess, a rack segment in said aperture and movable therethrough in engagement with said gear, an arm pivotally connected at one end to said handle and at its other end to said rack and movable relative to said handle to rotate the inner tube in opening and closing the device, yieldable means normally urging apart said arm and said handle, means limiting the spread of the arm and handle under the tension of said yieldable means to define the closed position of said inner tube, and trigger means engaging said rack to lock said arm and said handle in compressed position and the device in its opened condition against the tension of said yieldable means.

7. In a sampling device for fluids embodying a pair of telescoped tubes each having a plurality of longitudinally extending slots adapted to be brought into registry in the opening and closing of the device, a pair of longitudinally extending fins disposed on either side of the slots in the outer of the telescoped tubes.

JOHN SOLLIE.